(12) United States Patent
Lepp et al.

(10) Patent No.: US 10,863,385 B2
(45) Date of Patent: Dec. 8, 2020

(54) USING RATE BUCKETS

(71) Applicant: BlackBerry Limited, Waterloo (CA)

(72) Inventors: James Randolph Winter Lepp, Ottawa (CA); Michael Peter Montemurro, Toronto (CA); Stephen McCann, Southampton (GB)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/276,099

(22) Filed: Feb. 14, 2019

(65) Prior Publication Data
US 2019/0342796 A1 Nov. 7, 2019

Related U.S. Application Data

(60) Provisional application No. 62/666,983, filed on May 4, 2018.

(51) Int. Cl.
*H04W 28/20* (2009.01)
*H04W 4/40* (2018.01)
*H04L 1/00* (2006.01)

(52) U.S. Cl.
CPC .......... *H04W 28/20* (2013.01); *H04L 1/0002* (2013.01); *H04L 1/0011* (2013.01); *H04W 4/40* (2018.02)

(58) Field of Classification Search
CPC .... H04L 47/14; H04L 47/215; H04L 47/2408
See application file for complete search history.

(56) References Cited

U.S. PATENT DOCUMENTS

| | | | | |
|---|---|---|---|---|
| 8,942,253 | B2* | 1/2015 | Juan | H04W 36/06 370/437 |
| 9,160,503 | B2* | 10/2015 | Kim | H04L 1/0003 |
| 10,608,938 | B2* | 3/2020 | Lee | H04W 4/60 |
| 2012/0224612 | A1 | 9/2012 | Kim et al. | |

FOREIGN PATENT DOCUMENTS

| | | |
|---|---|---|
| WO | 95/35002 A1 | 12/1995 |
| WO | 2016/209197 A1 | 12/2016 |

OTHER PUBLICATIONS

Campolo et al., Nets4Cars-8, Data Rate Selection in WBSS-Based IEEE 802.11p/WAVE Vehicular Ad Hoc Networks, IEEE, CSNDSP 2010 (5 pages).

Canadian ISA/CA, International Search Report and Written Opinion for PCT/CA2019/050526 dated Jul. 4, 2019 (11 pages).

IEEE Standards Association, IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications, IEEE Std 802.11 2016, 3534 pages.

(Continued)

*Primary Examiner* — Chandrahas B Patel
(74) *Attorney, Agent, or Firm* — Trop, Pruner & Hu, P.C.

(57) ABSTRACT

In some examples, a wireless device selects a selected rate bucket of a plurality of different rate buckets, a rate bucket of the plurality of different rate buckets comprising a plurality of coding rates. In some examples, the selected rate bucket can include at least one other encoding capability, such as a modulation or a coding scheme.

18 Claims, 2 Drawing Sheets

(56) References Cited

OTHER PUBLICATIONS

IEEE Standard for Information technology—Telecommunications and information exchange between systems Local and metropolitan area networks—Specific requirements, Part 11: Wireless LAN Medium Access Control (MAC) and Physical Layer (PHY) Specifications Amendment 4: Enhancements for Very High Throughput for Operation in Bands below 6 GHz, IEEE Std 802.11ac™-2013 (425 pages).

IEEE Standards Association, IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications, Amendment 5: Enhancements for Higher Throughput, IEEE Std 802.11n™ 2009 (536 pages).

IEEE Standard for Information technology (IEEE Std 802.11p-2010)—Telecommunications and Information Exchange Between Systems Local and Metropolitan Area Networks—Specific Requirements Part 11: Wireless LAN Medium Access Control (MAC) and Physical Layer (PHY) Specifications, Amendment 6: Wireless Access in Vehicular Environments, Jul. 15, 2010 (51 pages).

IEEE Standard for Wireless Access in Vehicular Environments (WAVE)—Networking Services, IEEE Vehicular Technology Society, IEEE Std 1609.3™-2016 (160 pages).

IEEE P802.11ax™/D2.2, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Enhancements for High Efficiency WLAN, Feb. 2018 (620 pages).

PCT International Preliminary Examination Authority, Written Opinion of the International Preliminary Examining Authority for PCT/CA2019/050526 dated May 13, 2020 (6 pages).

Wikipedia, "OSI Model," Apr. 13, 2018 (7 pages).

* cited by examiner

USING RATE BUCKETS

CROSS-REFERENCE TO RELATED APPLICATION

This application claims the benefit of U.S. Provisional Application No. 62/666,983, filed May 4, 2018, which is hereby incorporated by reference.

BACKGROUND

Electronic devices are able to connect to wireless networks to perform data communication. An example wireless network includes a wireless local area network (WLAN) according to the Institute of Electrical and Electronics Engineers (IEEE) 802.11 standards.

BRIEF DESCRIPTION OF THE DRAWINGS

Some implementations of the present disclosure are described with respect to the following figures.

Figure 1:
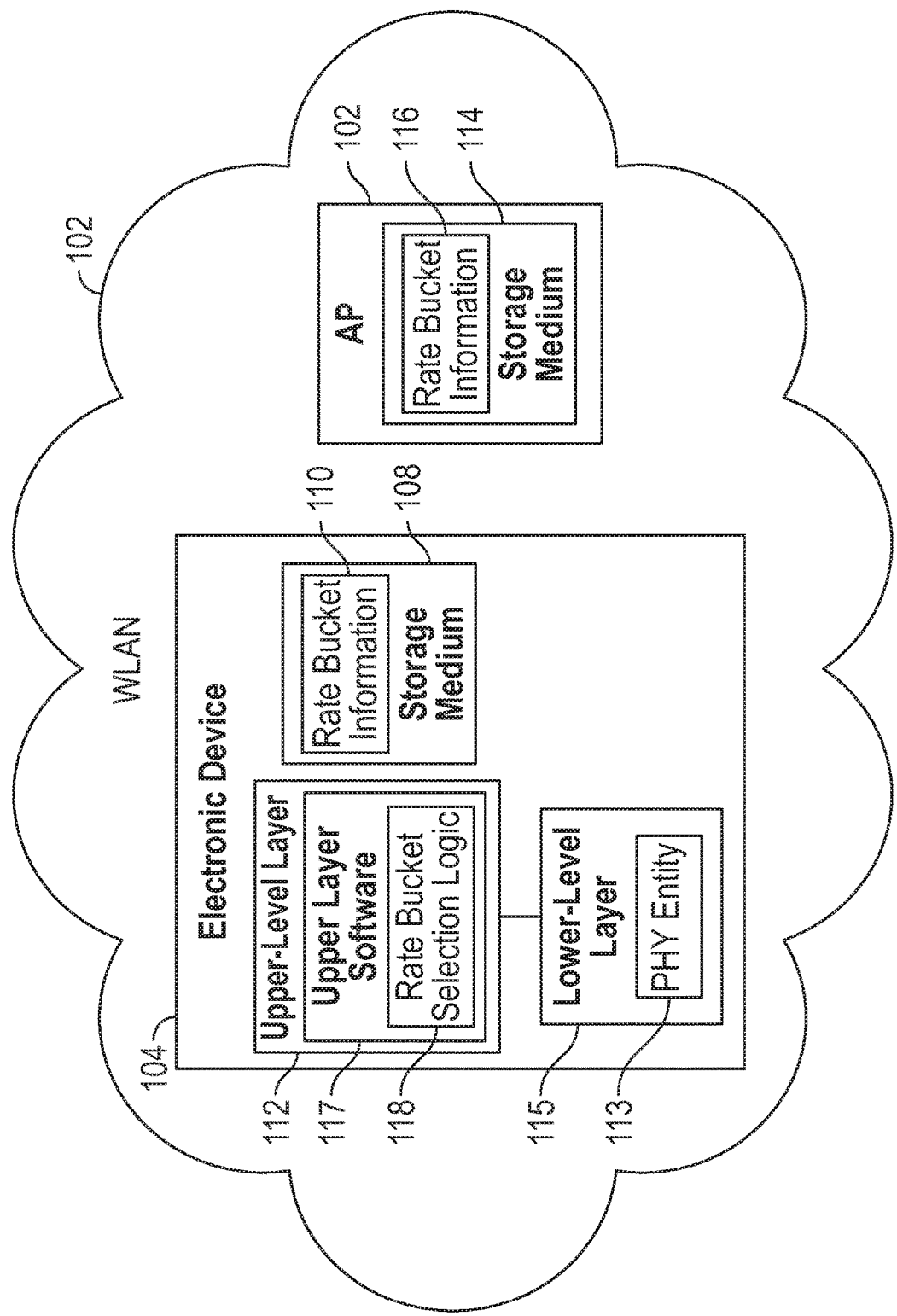
FIG. 1 is a block diagram of an example arrangement according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Vehicles can be provided with communication components to allow the vehicles to communicate with each other, with a network or other service infrastructure, or with another device. Examples of information that can be transmitted or received by vehicles can include data collected by sensors, traffic information, status information, and so forth.

Examples of vehicles include motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., space planes, space shuttles, space capsules, space stations, satellites, etc.), watercraft (e.g., ships, boats, hovercraft, submarines, etc.), railed vehicles (e.g., trains and trams, etc.), pedestrians and bicycles and other types of vehicles including any combinations of any of the foregoing, whether currently existing or after arising.

Vehicle-to-everything (loosely termed "V2X") is a feature that provides for communication of information from a vehicle to other entities (and possibly also/alternatively vice versa) that may affect the vehicle and/or the other entities. V2X includes one or more of a subset of features, including communication of a vehicle to/from any or some combination of the following: other vehicles (vehicle-to-vehicle or V2V communication); an infrastructure, e.g., roadside units (vehicle-to-infrastructure or V2I communication); a pedestrian (vehicle-to-pedestrian or V2P communication); a network (vehicle-to-network or V2N communication); a device, e.g., an electronic device within the vehicle (vehicle-to-device or V2D communication), an electricity grid (vehicle-to-grid or V2G communication); and so forth.

Networks that support V2X communication can include a cellular network or another type of wireless network. An example cellular network can operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, other types of cellular networks can be employed, such as second generation (2G) or third generation (3G) cellular networks, e.g., a Global System for Mobile (GSM) cellular network, an Enhanced Data rates for GSM Evolution (EDGE) cellular network, a Universal Terrestrial Radio Access Network (UTRAN), a Code Division Multiple Access (CDMA) 2000 cellular network, and so forth. In further examples, cellular networks can be fifth generation (5G) or beyond cellular networks.

Other types of wireless networks can include a wireless local area network (WLAN) that operates according to the Institute of Electrical and Electronics Engineers (IEEE) 802.11 standards (e.g. Dedicated Short Range Communication (DSRC)), IEEE 802.11a standards, IEEE 802.11p standards, IEEE 802.11bd standards (e.g. Enhancements for Next Generation V2X), an Integrated Digital Enhanced Network (iDEN), and so forth.

Institute of Electrical and Electronics Engineers (IEEE) 802.11p is an amendment to the IEEE 802.11 standard to add Wireless Access in Vehicular Environments (WAVE). IEEE 802.11p defines enhancements to IEEE 802.11 for supporting intelligent transportation systems.

IEEE 802.11a is an amendment to the IEEE 802.11 standard that defines requirements for an orthogonal frequency division multiplex (OFDM) communication system.

IEEE 802.11bd is an amendment to the IEEE 802.11 standard that defines further requirements for intelligent transportation systems that are backwards compatible with IEEE 802.11p technology.

IEEE 1609.3 is a standard for WAVE Networking Services and typically uses IEEE 802.11p technology as a radio bearer.

Issue 1: Rate Diversity

PHY refers to a physical layer, which is layer 1 of the Open Systems Interconnection (OSI) model. According to IEEE 802.11a, the physical layer can employ a 10-megahertz (MHz) channel, which is also referred to as the 10-MHz PHY. The 10-MHz PHY is used by IEEE 802.11p. Eight data rates (referred to as PHY rates) are defined for the 10-MHz PHY. As examples, the eight PHY rates include the following: 3 megabits per second (Mb/s), 4.5 Mb/s, 6 Mb/s, 9 Mb/s, 12 Mb/s, 18 Mb/s, 24 Mb/s, and 27 Mb/s. The different PHY rates can employ respective different combinations of the data modulation used and the coding rate used. Data modulation refers to a technique of modulating data, while coding rate refers to a percentage (or more generally, a portion) of a data stream used to carry useful data.

Traditionally, there is little diversity between the data rates—in other words, the difference in data modulations and coding rates used with the respective data rates is small.

In the next generation of IEEE 802.11 physical layers, there are multiple different requirements pulling in different directions: long range, higher data rate, larger frame sizes, higher reliability, and so forth. Also, V2X applications or services can have requirements that differ from those of other types of communications. Generally, an application may not have a way to easily request a type of radio communications with target properties for transmitting data frames.

Issue 2: Backwards Interoperability

A Basic Service Set (BSS) refers to a group of wireless devices associated with one another, such as those associated with a respective access point (AP) of a WLAN. Outside the context of a BSS (OCB) refers to a style of networking with IEEE 802.11p and IEEE 802.11bd that does not rely on a traditional AP and client (station or STA) model.

OCB is typically used by broadcast-only, unacknowledged services. The lack of acknowledgements and the rapidly changing vehicular environment does not provide an ability to negotiate capabilities between two stations. This leads to an issue of designing for backwards interoperability.

Issue 3: WSMP Definition of "Data Rates" is Too Narrow

WAVE is provided by IEEE 802.11p. A WAVE Service Advertisement (WSA) message, as defined by IEEE 1609.3, advertises the availability of services provided using a WAVE Short Message Protocol (WSMP). Currently WSA includes both channel information and application information A WSA message has a notion of "data rates" (in the form of a Data Rate subfield in the WSA message as defined by IEEE 1609.3-2016). However, a data rate indicated in the WSA message advertises a minimum rate for an advertised service. However, an advertised service may have other requirements instead of just the minimum rate. For example, there can be more than one way to combine modulation, coding and orthogonal frequency domain multiplexing (OFDM) to achieve a given data rate. The current definition of data rate in WSMP cannot account for this.

Example Implementations

FIG. 1 is a block diagram of an example arrangement that includes a WLAN 102. The WLAN 102 includes an AP 106 with which an electronic device 104 is able to wirelessly communicate. The WLAN 102 can include multiple APs, and there may be multiple electronic devices to communicate with the one or more APs of the WLAN 102.

Examples of electronic devices include computers (e.g., tablet computers, notebook computers, desktop computers, server computers, etc.), handheld devices (e.g. smart phones, personal digital assistants, etc.), wearable devices (smart watches, electronic eyeglasses, head-mounted devices, etc.), game appliances, health monitors, vehicles (or equipment in vehicles), cargo transportation units (e.g., trailers, containers, etc.), Internet of Things (loT) devices, roadside units (RSUs) (such as devices in traffic lights, traffic signs, etc., that are able to transmit information to vehicles or other devices), storage devices, communication nodes, or other types of endpoint or user devices that are able to communicate wirelessly. Electronic devices can include mobile devices and/or fixed position devices. More generally, an electronic device can refer to a device that is able to communicate wirelessly.

In some examples, the AP 106 and the electronic 104 can communicate according to IEEE 802.11. In other examples, the AP 106 can include a wireless access network node that operates in a wireless network according to a different communication standard, such as a cellular network standard. Example cellular network standards can include the Long-Term Evolution (LTE) standards from the Third Generation Partnership Project (3GPP), a fifth generation (5G) standard, and so forth. An LTE wireless access network node can be referred to as an evolved NodeB (eNodeB), for example.

As used here, a "wireless device" can refer to an electronic device or an AP.

1. Diverse Data Rate Buckets

In accordance with some implementations of the present disclosure, PHY rates and features can be bundled into a finite number of rate buckets. Each rate bucket can include a number (one or more) of encoding capabilities, where each encoding capability includes a combination that includes at least two of a modulation, a coding rate, and a coding scheme.

An example list of rate buckets is set forth in Table 1 below.

TABLE 1

| Name | Index | Modulation(s) | Coding rate(s) | | | |
|---|---|---|---|---|---|---|
| Long Range A | 0 | | | LDPC | STBC | DCM |
| Long Range B | 1 | | | LDPC | STBC | |
| Ultra Robust A | 2 | | | LDPC | STBC | Tone Spacing |
| Ultra Robust B | 3 | | | LDPC | STBC | Tone Spacing |
| Large Frame A | 4 | | | Midamble | STBC | MIMO |
| Large Frame B | 5 | | | Midamble | STBC | MIMO |
| High Throughput A | 6 | | | Short GI | MIMO | |
| High Throughput B | 7 | | | Short GI | MIMO | |

In the example rate bucket of Table 1, the first column lists the names of the different data rate buckets, including the "Long Range A" rate bucket, the "Long Range B" rate bucket, the "Ultra Robust A" rate bucket, etc.

The Index column of Table 1 lists the index numbers for the corresponding rate buckets.

A rate bucket can specify one or more modulation techniques and/or one or more coding rates. Examples of modulation techniques include Quadrature Amplitude Modulation (QAM) (e.g., 16-QAM, 64-QAM, 256-QAM, etc.), Binary Phase Shift Keying (BPSK), Quadrature Phase Shift Keying (QPSK), and so forth.

Collectively, the modulation technique and coding rate used is referred to as a modulation and coding scheme (MCS). A rate bucket can specify the use of a single MCS (i.e., one modulation technique and one coding rate) or multiple MCSs (multiple modulation techniques and/or multiple coding rates).

Other features that can be defined for use in a rate bucket can include a low density parity check (LDPC) (which is an error correction code to correct data errors, such as for a noisy transmission medium), a midamble (which includes a training field transmitted between portions of data to enable accurate estimation or to perform sounding of a Multiple-Input Multiple-Output (MIMO) channel), and a short guard interval (GI) (which is a guard interval between transmissions that is shorter than a regular GI). A GI separates transmissions to avoid interference between the transmissions. In the example of Table 1, the Long Range A data rate uses LDPC, the Large Frame A data rate uses midamble, and the High Throughput A data rate uses Short GI.

More generally, the foregoing features (LDPC, midamble, and short GI) are examples of features relating to protection against errors in transmitted data.

Further features that can be defined in a rate bucket can include Space-Time Block Coding (STBC) and MIMO. MIMO uses multiple antennas at a sending device to transmit over multiple different signal paths for receipt by corresponding antennas of a receiving device, to increase data throughput or data reliability. STBC refers to a technique that transmits the same data twice over different signal paths to increase the chance of a receiving device successfully receiving the data.

Yet additional features that can be defined in a rate bucket include Dual (Sub-) Carrier Modulation (DCM), Tone Spacing, and MIMO. DCM can introduce frequency diversity by transmitting the same data on two subcarriers separated in frequency. Optimizing tone spacing, also known as subcarrier spacing, can increase the reliability of data transmissions. Creating new modulation schemes (data rates) that increase the frequency separation of the orthogonal subcarriers, reduces the OFDM symbol impact of Doppler shift. Such additional features relate to the ability of the wireless signal to be resistant to properties of the wireless channel that degrade the signal or otherwise prevent a receiver from receiving it. For example, these features can be optimized to overcome Doppler effects due to relative speed of vehicles, interference from reflections, and interference from different types of noise.

The foregoing further and additional features relate to data signal diversity for improved reliability in data communications.

Features including LDPC, midamble, short GI, STBC, MIMO, DCM and tone spacing relate to different PHY coding schemes.

The choice of modulation techniques, coding rates, and/or other features included within a rate bucket can be left up to rate adaptation algorithms, but capabilities can be indicated or negotiated at the rate bucket level.

In some examples, instead of a linear set of data rates increasing in bitrate, a rate bucket can bundle the features into property-specific data rate buckets, such as one or more long range data rate buckets, one or more ultra robust (high reliability) data rate buckets, one or more large frame rate buckets, one or more high throughput buckets. Because these example features are sometimes in conflict with each other they can't be easily arranged in a linear fashion. For example, the design which achieves long range may involve coding or repetition features which look inefficient and counter to the goal of high throughput. In this way the goals of and the features used in the long range rate bucket are necessarily different than the features used in the high throughput rate bucket.

Rate buckets include both traditional MCS features as well as additional PHY features (e.g., the PHY coding schemes discussed above). This keeps the number of rate buckets at a finite number instead of each additional feature doubling the number of rate combinations available. For example, if there are 2, 4, or 8 rate buckets (indicated by 1, 2, or 3 bits), each containing 2, 4, or 8 rates (indicated by 1, 2, or 3 bits), the capabilities can be conveyed within just a few bits instead of a large number of bits used to indicate multiple independent features.

As shown in FIG. 1, the electronic device 104 includes a storage medium 108 that stores rate bucket information 110. The rate bucket information 110 includes information for one or more rate buckets that can be selected for use by an upper-level layer 112 of the electronic device 104. A similar rate bucket information 116 can be stored in a storage medium 114 of the AP 106.

An upper-level layer 112 of the electronic device 104 can include an application layer (including one or more application programs), an operating system (OS) layer (including an OS), or other layer (or a combination of multiple layers) that is above a lower-level layer 115 of the electronic device 104.

The lower-level layer 115 can include a Medium Access Control (MAC) layer, a physical (PHY) layer, or other layer (or a combination of multiple layers) associated with the management of communicating data over a communications medium between the electronic device 104 and the AP 106.

Once the rate buckets are defined and included in the rate bucket information 110, an entity (e.g., an application) in the upper-level layer 112 can choose a rate bucket (from multiple rate buckets indicated by the rate bucket information 110) based on performance specifications of the entity.

Such an entity is referred to as an upper layer software 117 that is part of the upper-level layer 112. The upper layer software 117 can be an application, an OS, an API library and so forth. The upper layer software 117 includes a rate bucket selection logic 118 (including machine-readable instructions, for example), which is able to select a rate bucket from among multiple rate buckets indicated by the rate bucket information 110.

For each data frame passed to the lower-level layer 115 of the electronic device 104 for transmission over a wireless network, the rate bucket selection logic 118 can request a rate bucket based on the specifications of the rate bucket selection logic 118. The rate bucket may include one or more DATARATEs as specified in a Transmission Vector (TXVECTOR) of the transmitting electronic device 104. The TXVECTOR (such as defined by IEEE 802.11-2016) represents a list of parameters that the MAC layer provides to the local PHY entity in order to transmit a Physical Layer Service Data Unit (PSDU), which is an atomic data unit of a PHY layer. The DATARATE parameter can be inclusive of one or more of the MCS, channel bandwidth, GI information, the number of spatial streams and space-time block codes, and so forth.

The rate bucket may include more parameters than currently specified in TXVECTOR DATARATE, for example, including forward error correction coding such as LDPC or convolution coding.

Examples of applications or other rate bucket selection entities that can choose a specific rate bucket can include:

- An application of a vehicle discovering platoons to join (e.g., by sending data frames using features of a long range rate bucket (e.g., Long Range A or Long Range B in Table 1), where such features support long range communications while communication latency is not important).
- An application of a vehicle communicating data after joining a platoon (e.g., by sending data frames using features of an ultra robust rate bucket (e.g., Ultra Robust A or Ultra Robust B in Table 1), where the features are used for short-range communications and support low latency and high reliability communications).
- An application that sends basic safety messages (BSMs) using features of a rate bucket that includes legacy modulation and coding rates (i.e., backward compatibility is important.

To provide backward compatibility, the rate bucket used to transmit a data frame may be bound to the application. For example, Dedicated Short Range Communication (DSRC) BSM messages are sent at 6 Mb/s (using QPSK, ½ coding rate, convolution coding) in order to interoperate with IEEE 802.11p legacy systems. DSRC new applications (possibly termed Next Generation V2X (NGV)—capable applications, e.g. as defined by IEEE 802.11bd) can be defined to only use new rates from a new rate bucket.

Devices (stations or STAs, on-board units (OBUs), or RSUs) operating specific applications can transmit data frames containing the applications' data at a rate that is specified (or a subset of allowed rates) for those applications.

In some examples, the electronic device 104 transmitting a data frame to another wireless device (e.g., the AP 106) is able to read an Application Identifier (AID) or Provider Service Identifier (PSID) or Service Specific Parameter (SSP) in an application layer message (e.g., sent by the upper layer software 117) and invoke the lower-level layer 115 (e.g., a PHY entity 113 in the lower-level layer 115) of the electronic device 104 to transmit the data frame with features of a specific rate bucket based on that AID/PSID value. The rate bucket used can be set on a per-frame basis.

Note that a Service Specific Parameter refers to another layer of permissions below PSID. An application can include a PSID and multiple SSPs. For instance, vehicles can be assigned a single PSID for BSMs. The BSMs can be assigned permissions assigned by SSP and PSID values. For example, a first responder vehicle may have been allocated a PSID and SSP for BSMs similar to any other driver, but a separate set of SSPs for first responder messages.

1.1 Example Rate Bucket Setting Techniques

The application layer message prepared by the upper layer software 117 can include an Intelligent Transportation System (ITS) message, such as a Basic Safety Message (BSM), a Map Data/Signal Phase and Time (MAP/SPAT) message, a Cooperative Awareness Message (CAM), a Decentralized Environmental Notification Message (DENM), or other message. In other examples, the upper layer software 117 can send a different type of application layer message.

Typically, ITS messages are encoded into Abstract Syntax Notation One (ASN.1) with a compressed binary encoding such as unaligned-Packed Encoding Rules (PER). The upper layer software 117 reads the PSID of a message frame, and when passing the message frame to the lower-level layer 116 for transmission also provides the lower-level layer 116 with the rate bucket (as selected by the rate bucket selection logic 118) to be used for transmission. The rate bucket information 110 can contain a stored list of rate bucket to PSID mappings, where different PSIDs (or alternatively AIDs or other identifiers) are mapped to respective rate buckets.

Alternatively, instead of explicitly setting the rate bucket with every message frame, an application programming interface (API) can be used to set the rate bucket, which is then used for subsequent message frames until a different rate bucket is set. In this case, the upper layer software 117 maintains the state of the lower-level layer's rate bucket setting and changes the lower-level layer's rate bucket setting when appropriate.

If the upper layer software 117 is sending an encoded packet that includes concatenated messages containing information of more than one PSID, the upper layer software 117 may compare the multiple rate buckets associated with the multiple PSIDs and select the rate bucket that is the lowest common denominator. If there is a conflict between rate bucket requirements of the two PSIDs (for example, a first PSID maps to a high throughput rate bucket and a second PSID maps to a high reliability rate bucket in a way that cannot both be met), the upper layer software 117 may choose to transmit this as two different message frames with different rate buckets (and ultimately different rates/codings).

In alternative examples, instead of deciding to split out multiple PSIDs into different message frames, the decision may have been made earlier where rate bucket requirements of a particular PSID are input to the algorithm deciding to concatenate multiple PSIDs into the same packet or not.

In some examples, the data transmission APIs defined in IEEE 1609.3 can be modified as shown below to replace the Data Rate parameter with a Data Rate Bucket parameter.

DL-UNITDATAX.request parameters are set as follows (underlined text identifies new text not in existing standard):

| | |
|---|---|
| source_address | Set to the IEEE 802.11 dot11StationID for the WAVE interface. |
| destination_address | Set to the Peer MAC Address from the WSM-WaveShortMessage.request. |
| data | Set as described in the subsequent discussion. |
| priority | Set to the User Priority from the WSM-WaveShortMessage.request. |
| service class | May be set to QoSAck or QoSNoAck per IEEE Std 802.11. |
| Channel Identifier | Set to the Channel Identifier from the WSM-WaveShortMessage.request. |
| Time Slot | Set to the Time Slot from the WSM-WaveShortMessage.request. |
| Data Rate <u>Bucket</u> | Set to the Data Rate <u>Bucket</u> from the WSM-WaveShortMessage.request. |
| TxPwr_Level | Set as described in the subsequent discussion. |
| Channel Load | Set to the Chanel Load from the WSM-WaveShortMessage.request. |
| Expiry Time | Set to the Expiry Time from the WSM-WaveShortMessage.request. |

Another alternative is to set the Data Rate with either zero or a minimum rate, and add a new parameter for the Data Rate Bucket, or for specific modulation or coding features.

1.2 MLME, PLME, and TXVECTOR

The rate buckets may not have a 1-to-1 mapping to the TXVECTOR DATARATE parameter. The rate buckets are exposed to the upper layer software 117 to indicate or choose their radio requirements. In some cases, the rate bucket chosen can correspond directly to specific settings in the TXVECTOR.

In other cases, an intermediate layer can be used to set the specific TXVECTOR parameters based on the rate bucket chosen by the upper layer software 117 from a set of parameters available to use in the chosen rate bucket. To do this, a rate bucket API may be available for the upper layer software 117 with get and set parameters.

Examples of the intermediate layer can include a driver, a management entity, or another entity. For example, a management entity can include a MAC Layer Management Entity (MLME) or a PHY Layer Management Entity (PLME).

In the case where a rate bucket has more than one rate or parameter set, the intermediate layer may choose the TXVECTOR parameters based on an algorithm with both the chosen rate bucket and other input. The other input may include any one or more of channel estimation, medium utilization percentage, relative priority of multiple traffic queues, and so forth.

2. Indication of Supported Capabilities 2.1 Indicating a Rate Bucket in a WSA

As noted above, a WAVE Service Advertisement (WSA) message, as defined by IEEE 1609, advertises the availability of services provided using a WAVE Short Message Protocol (WSMP). A WSA message has a notion of "data rates" (in the form of a Data Rate subfield in the WSA message as defined by IEEE 1609.3-2016). According to current standards, the Data Rate subfield in an WSA message is a 7-bit integer representing data rate in 500 kilobits per second (kbps) increments.

In accordance with some implementations of the present disclosure, an element extension can be added to WSA to indicate a specific rate bucket (as discussed above). The rate bucket indication is included in a WSA message and transmitted to other wireless devices (STAs). A receiving wireless device can follow procedures normally followed when receiving a WSA message, but can choose the rate at which to communicate based on the rate bucket indicated.

For backwards compatibility, a WSA message may be sent at one of the legacy rates, and in particular one of the mandatory rates from the legacy rate set, such as defined by IEEE 802.11-2016. However, the advertised service may be operated at the higher rate or more robust coding scheme of the rate bucket that is indicated by the rate bucket indication.

2.2 Indicating a Supported Rate or Encoding Capability

In further implementations of the present disclosure, an element extension can be added to a WSA message to indicate supported PHY rates and other PHY encoding capabilities (such as indicated by parameters in Table 1). Note that instead of a few bits to indicate the rate bucket, this rate/encoding capability indication involves listing out all optional parameters (such as those listed in Table 1). The receiving wireless device can follow procedures normally followed when receiving a WSA message, but can choose the PHY rate and/or other encoding capability indicated by the rate/encoding capability indication at which to communicate.

2.3 WSA Formatting

The following describes changes to the WSA message formatting according to some implementations of the present disclosure. In other examples, other formatting changes can be implemented.

A Channel Info Segment is extended with additional information about the channel capabilities. There are several basic options. First and second options (Option 1 and Option 2) involve changing the WSA Version (which was 3 in IEEE 1609.3-2016) and redefining the fields. A third option (Option 3) adds a Wave Information Element Extension.

Option 1

With Option 1, the WSA is revised to use the following new format for the Channel Info Segment (see Table 2 below). This new format for the Channel Info Segment replaces the "Data Rate" 7-bit value with a 7-bit "Rate Bucket" value, in some examples.

TABLE 2

| | Operating Class | Channel Number | Transmit Power Level | B7 Adaptable | B6 B0 Rate Bucket | Channel Info Option Indicator | Wave Information Element Extension |
|---|---|---|---|---|---|---|---|
| Octets | 1 | 1 | 1 | 1 bit | 7 bits | 1 | variable |

In some examples, Table 2 above is modified from FIG. 25 of IEEE 1609.3-2016 (with changes indicated by underlined text). Note that the numbers of bytes or bits indicated for each field are example values.

Option 2

With Option 2, the WSA is revised to use the following new format for Channel Info Segment (see Table 3 below). Option 2 keeps the Data Rate field unchanged, but adds additional fields for other PHY properties. The added fields include a Rate Bucket field and a PHY Capabilities field. The Rate Bucket field indicates whether a rate bucket is used, and the PHY Capabilities field includes a value indicating the encoding capability to use (based on a combination of parameters such as those in Table 1).

TABLE 3

| | Operating Class | Channel Number | Transmit Power Level | B7 Adaptable | B6 B0 Data Rate | Rate Bucket | PHY Capabilities | Channel Info Option Indicator | Wave Information Element Extension |
|---|---|---|---|---|---|---|---|---|---|
| Octets | 1 | 1 | 1 | 1 bit | 7 bits | 1 | 3 | 1 | variable |

In some examples, Table 3 above is modified from FIG. 25 of IEEE 1609.3-2016 (with changes indicated by underlined text). Note that the numbers of bytes or bits indicated for each field are example values.

Option 3

With Option 3, the version number of WSA is not changed, but a Wave Information Element Extension is added.

TABLE 4

| | | | Contents | | | |
|---|---|---|---|---|---|---|
| WAVE Element ID | Length | HT Capability Information Field | VHT Capability Information Field | HE Capability Information Field | Rate Bucket |
| Octets | 1 | variable | 2 | <u>4</u> | <u>9</u> | <u>1</u> |

In some examples, Table 4 above is modified from FIG. 15 of IEEE 1609.3-2016 (with changes indicated by underlined text). Note that the numbers of bytes or bits indicated for each field are example values.

The WAVE Element ID is a fixed value assigned for advanced radio/PHY capabilities and listed in normative Annex F of IEEE 1609.3. The WAVE Element ID indicates the format of the content after the Length field to receiving wireless devices.

The Length field contains the sum of the length of all the contents. The Length field is set by the transmitting wireless device and may be variable or fixed based on the way the particular WAVE Element ID is defined.

3. Poke and Pull

Outside the context of a BSS (OCB) refers to a new style of networking with IEEE 802.11p and IEEE 802.11bd that does not rely on a traditional AP and client (STA) model._OCB is typically a broadcast-only, unacknowledged service that does not provide an ability to negotiate capabilities between two stations. Capabilities are typically negotiated during the frame exchange that is part of association and the OCB operating mode has not association step. This leads to an issue of designing for backwards interoperability.

Many OCB applications exclusively use broadcast data with no acknowledgements. This also means that there is no ability to negotiate capabilities and then base further communications between wireless devices on the best match of the capabilities of the wireless devices.

In some implementations of the present disclosure, a Poke and Pull technique involves a first wireless device sending a request (a poke) at the legacy rate and receiving a response frame (a pull) at either the legacy rate or a next generation rate. The request contains the transmitting wireless device's rate capability information. This allows for an opportunity to communicate at the higher rates or dynamic rate changes to occur during the lifetime of the communication between the wireless devices.

The response frame may also contain the receiving wireless device's rate capability information. The rate capability information sent by both the transmitting wireless device and the receiving wireless device may be described as supported rate buckets.

The Poke and Pull technique may be useful for platooning or other scenarios where two particular wireless devices are communicating for more than just a single packet/frame transfer, as would be typical of a vehicle mounted device driving by an RSU, or transmitting/receiving a V2V BSM-style beacon.

A request message of the Poke and Pull technique has a short content payload that is encoded at a legacy rate (relatively slow). The response message of the Poke and Pull technique has a larger content payload that is encoded at a highest (or higher) possible rate.

To implement poke and pull based capability negotiation (irrespective of any upper layer logic), basic PHY capabilities are added to the header of a Data frame, a Quality of Service (QoS) Data frame, a Management frame, or a QoS Management frame, according to some examples.

The following describes various options.

3.1 Option 1

With Option 1, existing PHY capabilities elements are placed into a Data frame, a QoS Data frame, a Management frame, or a QoS Management frame that is sent in OCB mode. Examples of existing PHY capabilities elements include: (a) fields for PHY capabilities of IEEE 802.11n (referred to as the high throughput (HT) PHY), (b) fields for PHY capabilities of IEEE 802.11ac (referred to as very high throughput (VHT) PHY), and (c) fields for PHY capabilities of IEEE 802.11ax (referred to as high efficiency (HE) PHY).

3.2 Option 2

With Option 1, a new PHY capabilities element specific to IEEE 802.11bd Next Generation V2X (NGV) is defined. The new PHY capabilities element is placed in the header of a Data frame, a QoS Data frame, a Management frame, or a QoS Management frame sent in OCB mode.

The new PHY capabilities element may include rate buckets as described above. The new PHY capabilities element may be as simple as a single bit indicating support of the IEEE 802.11bd NGV rates (as opposed to support of only IEEE 802.11p rates). Alternatively, the new PHY capabilities element may include more multiple bits to indicate version numbers, rate buckets, and/or specific PHY capabilities.

As the OCB mode is already defined in 802.11p, a new NGV mode (e.g. as defined by IEEE 802.11bd) may take a new name and be a new mode in addition to the OCB mode.

To save airtime in broadcast situations (for example when the poke or request is repeatedly broadcast), the PHY capabilities element may not be sent in every message frame but instead may be sent in every Xth frame (for example every fourth frame).

3.3 Choosing a Response Rate

A receiving wireless device can make a decision to choose the highest possible rate for the response message based on various factors.

Examples of the factors considered include one or more of:

The MCS capabilities sent in the request message.

A relative received signal strength (RSSI) expected versus received calculation (or threshold) when receiving the request message.

A particular MCS based on the application type. MCSs are pre-assigned for respective application types. Also, a set of one or more rates can be specified per application.

In other examples, a response message may be sent at a legacy rate.

3.4 Request Message Contents

A request message can contain one or more of the following information elements:

MCS capabilities of the transmitting wireless device sending. The MCS capabilities can include full PHY Capabilities or more a compressed list of rate buckets.

RSSI the request message is being transmitted at.

Application layer data (e.g., the request).

3.5 Response Message Contents

A response message can contain one or more of application layer data and aggregated packet data units (PDUs).

4. Flow Process

Figure 2:
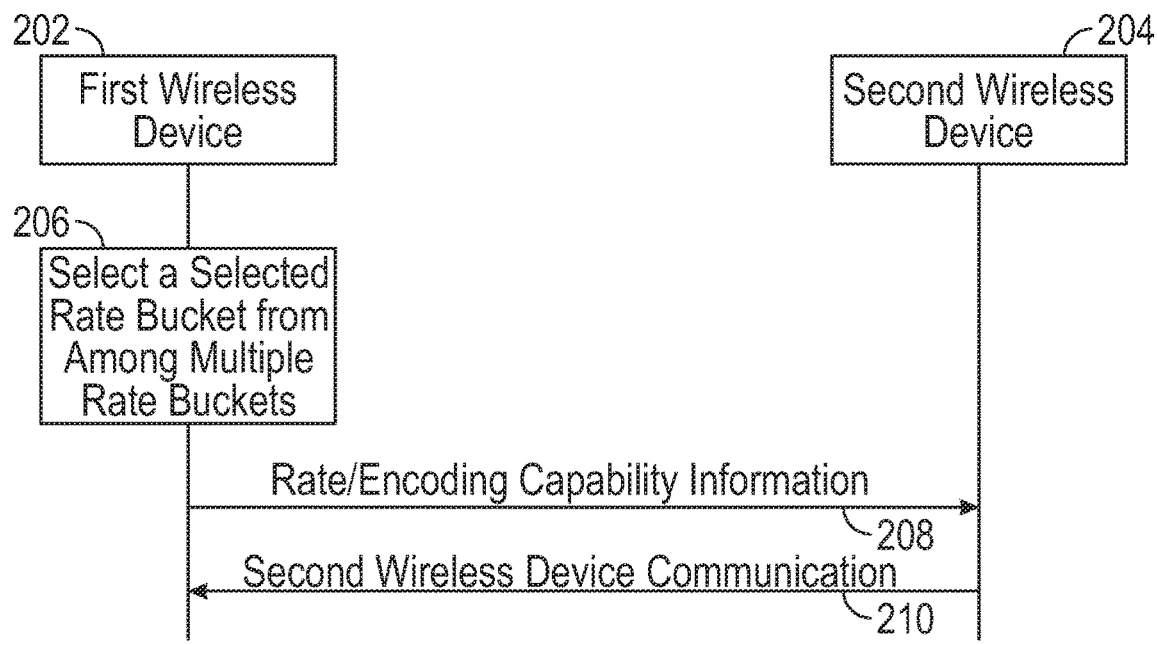
FIG. 2 is a message flow diagram of a process according to some implementations of the present disclosure.

FIG. 2 is a message flow diagram of an example process that can be performed for communications between a first wireless device 202 and a second wireless device 204 according to some implementations of the present disclosure. For example, the first wireless device 202 can be the electronic device 104 of FIG. 1, and the second wireless device 204 can be the AP 106 of FIG. 1, or vice versa.

The first wireless device 202 (or more specifically, a rate bucket selection logic 118 in the upper-level layer 117 of FIG. 1, for example) selects (at 206) a selected rate bucket from among multiple different rate buckets. The selected rate bucket is to be used in a wireless communication by the first wireless device 202. For example, a coding rate of the selected rate bucket can be used. More generally, an encoding capability of the selected rate bucket can be used, where the encoding capability is selected from a combination of one or more of modulation, coding rate, and coding scheme.

The selected rate bucket can be selected from among the multiple different rate buckets based on a use scenario, where different selected rate buckets are selected for different use scenarios (e.g., vehicle communication scenario, sensor data communication scenario, etc.).

After the selection, the first wireless device 202 sends (at 208) rate/encoding capability information to the second wireless device 204. The rate/encoding capability information can include information identifying the selected rate bucket, or other information that provides a rate/encoding capability of the first wireless device 202. For example, the rate/encoding capability information can be included in a WSA message or in a request of the Poke and Pull technique discussed above.

The second wireless device 204 responds (at 210) with a second wireless device communication. For example, the second wireless device communication can include a message frame communicated using the rate/encoding specified by the rate/encoding capability information sent by the first wireless device 202. As another example, the rate/encoding capability information can include a response message of the Poke and Pull technique discussed above.

5. Device Arrangement

Figure 3:
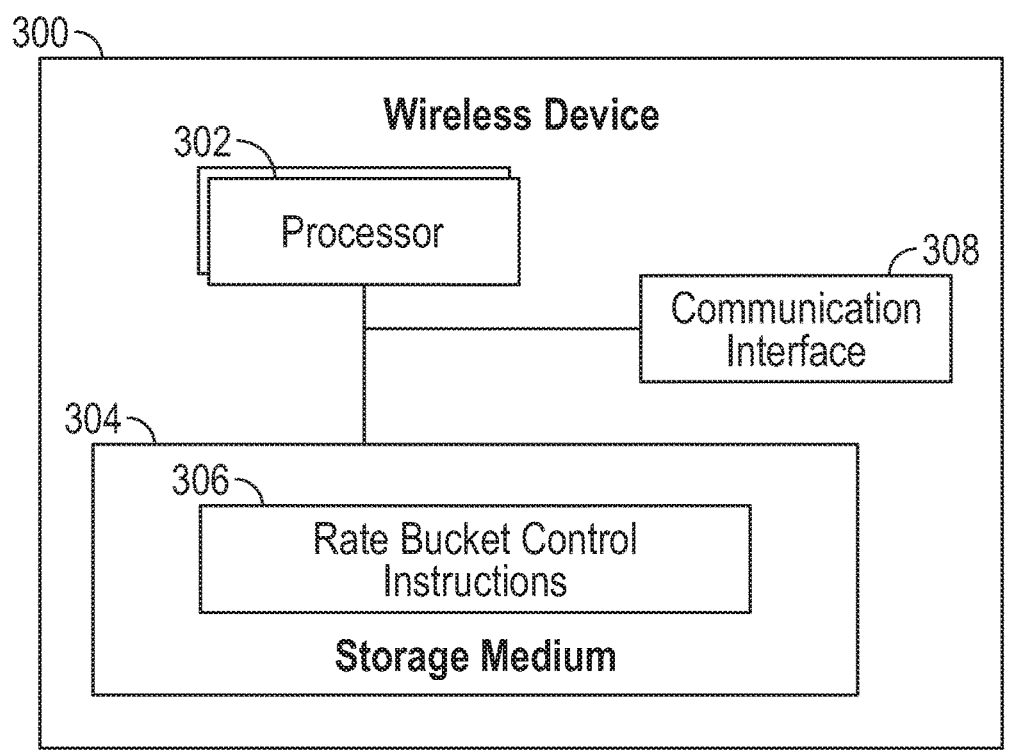
FIG. 3 is a block diagram of a wireless device according to some implementations of the present disclosure.

FIG. 3 is a block diagram of a wireless device 300 according to some examples. The wireless device 300 can be the electronic device 104, AP 102, first wireless device 202, or second wireless device 204 discussed above.

The wireless device 300 includes one or more hardware processors 302. A hardware processor can include a microprocessor, a core of a multi-core microprocessor, a microcontroller, a programmable integrated circuit, a programmable gate array, a digital signal processor, or another hardware processing circuit.

The wireless device 300 further includes a non-transitory machine-readable or computer-readable storage medium 304 storing machine-readable instructions that are executable on the one or more processors to perform respective tasks.

The machine-readable instructions can include rate bucket control instructions 306 to select a rate bucket from among multiple rate buckets as discussed above. The rate bucket control instructions 306 can also use a selected rate bucket. The rate bucket control instructions 306 can further negotiate with another wireless device to select a rate bucket, or other encoding capabilities.

The wireless device 300 includes a communication interface 308 to communicate wirelessly over a wireless network. The communication interface 308 includes a transceiver and a protocol stack including protocol layers that manage communication according to respective communication protocols.

The storage medium 304 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
selecting, by a wireless device, a selected rate bucket of a plurality of different rate buckets, a rate bucket of the plurality of different rate buckets comprising a plurality of coding rates; and
using the selected rate bucket in a wireless communication by the wireless device, wherein the using of the selected rate bucket comprises using a coding rate of the selected rate bucket and using at least one other encoding capability of the selected rate bucket, the at least one other encoding capability selected from among a modulation and a coding scheme.

2. The method of claim 1, further comprising:
sending, by the wireless device to another wireless device, an indication of at least one supported data rate and/or at least one supported encoding capability.

3. The method of claim 2, wherein the indication is included in a Wireless Access in Vehicular Environments (WAVE) Service Advertisement.

4. The method of claim 2, wherein the indication of the at least one supported data rate and/or the at least one supported encoding capability comprises an indication of at least one supported rate bucket.

5. The method of claim 1, wherein the selecting of the selected rate bucket from among the plurality of different rate buckets is based on an application identifier of an application or a provider service identifier.

6. The method of claim 1, further comprising:
sending, by a higher-level layer in the wireless device to a lower-level layer in the wireless device, an indication of the selected rate bucket.

7. The method of claim 6, wherein the indication is in a list of parameters useable by a PHY entity of the wireless device, the PHY entity being part of the lower-level layer.

8. The method of claim 1, wherein the selecting of the selected rate bucket from among the plurality of different rate buckets is based on a use scenario, where the different rate buckets are selected for different use scenarios.

9. A method comprising:
selecting, by a wireless device, a selected rate bucket of a plurality of different rate buckets, a rate bucket of the plurality of different rate buckets comprising a plurality of coding rates;
using the selected rate bucket in a wireless communication by the wireless device; and
sending, by the wireless device to another wireless device, an indication of at least one supported rate bucket, wherein the indication is sent by the wireless device at a legacy data rate.

10. The method of claim 9, further comprising:
receiving, by the wireless device from the another wireless device, a response indicating at least one supported data rate and/or at least one supported encoding capability of the another wireless device.

11. The method of claim 10, wherein the response is received from the another wireless device at the legacy data rate or at a next generation data rate.

12. The method of claim 9, wherein the indication is included in a Wireless Access in Vehicular Environments (WAVE) Service Advertisement.

13. A non-transitory machine-readable storage medium storing instructions that upon execution cause a first wireless device to:
use a selected rate bucket of a plurality of different rate buckets, the selected rate bucket comprising a plurality of coding rates; and
transmit to a second wireless device or receive from the second wireless device an indication of the selected rate bucket, wherein the transmission or the receipt of the indication of the selected rate bucket is at a legacy data rate.

14. The non-transitory machine-readable storage medium of claim 13, wherein the instructions upon execution cause the first wireless device to:
negotiate with the second wireless device to select an encoding capability.

15. The non-transitory machine-readable storage medium of claim 13, wherein the selected rate bucket is selected based on a use scenario, and the different rate buckets are selected for different use scenarios.

16. A wireless device comprising:
a communication interface to communicate over a wireless network; and
at least one processor configured to:
use a selected rate bucket of a plurality of different rate buckets, a rate bucket of the plurality of different rate buckets comprising a plurality of coding rates, and
send, to another wireless device at a legacy data rate, an indication of at least one supported rate bucket.

17. The wireless device of claim 16, wherein the at least one processor is configured to receive, from the another wireless device, a response containing an indication of at least one supported rate bucket of the another wireless device.

18. The wireless device of claim 16, wherein the at least one processor is configured to negotiate with the another wireless device to select the selected rate bucket.

* * * * *